US009771306B2

(12) United States Patent
Roach et al.

(10) Patent No.: US 9,771,306 B2
(45) **Date of Patent: *Sep. 26, 2017**

(54) ENVIRONMENTALLY-FRIENDLY HIGH POTASSIUM-CONTENT LIQUID FERTILIZER AND USES FOR THE FERTILIZER

(71) Applicant: Nachurs Alpine Solutions, Corp., Marion, OH (US)

(72) Inventors: Tommy Roach, Lubbock, TX (US); Gregory Bame, Marion, OH (US)

(73) Assignee: Nachurs Alpine Solutions, Corp., Marion, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,537

(22) Filed: Sep. 9, 2015

(65) Prior Publication Data

US 2016/0347675 A1 Dec. 1, 2016

Related U.S. Application Data

(60) Provisional application No. 62/169,519, filed on Jun. 1, 2015.

(51) Int. Cl.

| | |
|---|---|
| ***C05F 11/00*** | (2006.01) |
| ***C05D 1/00*** | (2006.01) |
| ***C05B 7/00*** | (2006.01) |
| ***C05B 17/00*** | (2006.01) |
| ***C05C 11/00*** | (2006.01) |
| ***C05C 1/00*** | (2006.01) |
| *C05F 3/00* | (2006.01) |

(52) U.S. Cl.

CPC .................. *C05D 1/00* (2013.01); *C05B 7/00* (2013.01); *C05B 17/00* (2013.01); *C05C 1/00* (2013.01); *C05C 11/00* (2013.01); *C05F 11/00* (2013.01); *C05F 3/00* (2013.01); *Y02P 60/214* (2015.11)

(58) Field of Classification Search

None

See application file for complete search history.

(56) References Cited

U.S. PATENT DOCUMENTS

| | | | | |
|---|---|---|---|---|
| 3,547,615 | A * | 12/1970 | Beckham | C05B 7/00 71/34 |
| 3,663,198 | A * | 5/1972 | Backlund | C05B 7/00 71/1 |
| 3,711,269 | A * | 1/1973 | Curlless | C05B 7/00 23/302 A |
| 3,956,464 | A * | 5/1976 | Drechsel | C01B 25/301 423/157.4 |
| 5,034,045 | A | 7/1991 | Alexander | |
| 5,814,123 | A * | 9/1998 | Hansen | C05F 11/00 71/11 |
| 8,091,275 | B2 * | 1/2012 | Bissonnette | C05G 3/0064 47/59 R |
| 8,475,558 | B2 * | 7/2013 | Josef | C01B 25/306 71/31 |
| 8,545,591 | B2 | 10/2013 | Fairweather et al. | |
| 9,161,489 | B1 * | 10/2015 | Miller | C05F 11/00 |
| 2004/0035162 | A1 * | 2/2004 | Williams | C05B 17/00 71/28 |
| 2005/0022570 | A1 * | 2/2005 | Duarte-MacDonald | C05B 13/06 71/33 |
| 2005/0119124 | A1 | 6/2005 | Alyeshmerni | |
| 2005/0172858 | A1 * | 8/2005 | Schonherr | C05F 11/00 106/287.24 |
| 2015/0007626 | A1 | 1/2015 | Fanning et al. | |
| 2016/0304407 | A1 * | 10/2016 | Bame | C05B 7/00 |

FOREIGN PATENT DOCUMENTS

| | | | |
|---|---|---|---|
| AU | 2007231893 | * | 5/2008 |
| SU | 1708804 | * | 1/1992 |

OTHER PUBLICATIONS

Clapp, KTS-Potassium thiosulfate—A versatile and expanding source of liquid potassium and sulfur for agriculture. In: Abstracts of Papers of the American Chemical Society. 1155 16th St, NW, Washington, DC 20036: Amer Chemical Soc, 1997. p. 6-FERT. http://www.plastiques-agriculture.com/BASEdeDONNEES/BdD_Indexation/AME0013M/AME0013M/AME0013M%2092%2094.pdf Clapp, J. G.; Kerley, T Dec. 31, 1997 (Dec. 31, 1997).

The Original—Potassium Thiosulfate Fertilizer <http://cropvitality.com/wp-content/uploads/2013/08/KTS-AppGuide.pdf> Tessenderlo Kerley, Inc Aug. 31, 2014 (Aug. 31, 2014).

* cited by examiner

*Primary Examiner* — Wayne Langel

(74) *Attorney, Agent, or Firm* — Joan Simunic

(57) ABSTRACT

The present invention provides a method for using a new liquid fertilizer comprising potassium from a potassium source selected from the group consisting of potassium acetate, potassium formate, potassium citrate, potassium succinate, potassium propionate, potassium phosphate, organic sources of potassium, animal manure, and combinations thereof, and having a slightly alkaline pH and relatively low salt index compared to other sources of potassium for liquid fertilizer products. The fertilizer composition may further comprise additives such as sulfur, zinc, boron, calcium, manganese, iron, copper, cobalt, magnesium, or a combination thereof.

15 Claims, No Drawings

ENVIRONMENTALLY-FRIENDLY HIGH POTASSIUM-CONTENT LIQUID FERTILIZER AND USES FOR THE FERTILIZER

CROSS-REFERENCE TO PRIOR APPLICATIONS

The present application claims priority to U.S. Patent Application 62/169,519 filed 1 Jun. 2015, which is incorporated by reference in its entirety.

FIELD OF THE INVENTION

The invention relates to a high potassium nutrient content liquid plant fertilizer product comprising water and potassium derived from an environmentally-friendly source. The fertilizer is provided as a low salt, slightly basic aqueous solution which can be applied to a variety of agricultural crops at a rate of from about 0.25 gallons per acre to about 10 gallons per acre.

BACKGROUND OF THE INVENTION

In order to maintain healthy growth, plants must extract a variety of nutrients from the soil in which they grow. However, many soils are deficient in the necessary nutrients or the soils contain them only in forms which cannot be readily taken up by plants. To counteract these deficiencies, commercial fertilizing products containing select nutrients are commonly applied to soils in order to improve growth rates and yields obtained from crop plants. For example, potassium may be added to soil to counteract a lack of available potassium.

Fertilizers come in two basic forms, liquid and dry. Liquid fertilizers have gained commercial approval mainly due to the ease of handling and application. However, for a liquid fertilizer to become a commercially viable product, it must have a relatively high nutrient analysis. Ideally, it also should be able to blend with other liquid fertilizers to supply the required nutrients for a growing crop.

Potassium is normally required by a growing plant to stimulate early growth, to increase protein production, and to activate enzyme and hormone systems within the plant. These systems impact the plant's ability to withstand biotic and abiotic stress, and improves the plant's resistance to diseases and insects. Further, potassium increases water use efficiency and transforms sugars to starch.

The typical potassium sources for fertilizers are inorganic potassium salts, such as potassium chloride (potash), potassium magnesium sulfate, potassium nitrate, and potassium sulfate. However, the inorganic anions found in these salts can have damaging effects on the environment. Thus, it would be beneficial to have an environmentally-friendly potassium source for liquid fertilizer products.

SUMMARY OF THE PRESENT INVENTION

A new high potassium-content liquid fertilizer having a potassium nutrient component derived from potassium acetate, potassium formate, potassium citrate, potassium succinate, potassium propionate, potassium phosphate, organic sources of potassium, animal manure, and combinations thereof, and wherein the fertilizer has a neutral to slightly alkaline pH, and a relatively low salt index is described. The high potassium-content liquid fertilizer described herein results in lower phytotoxicity damage compared to other sources of potassium for liquid fertilizer products. The fertilizer composition may further comprise additives such as sulfur, zinc, boron, calcium, manganese, iron, copper, cobalt, magnesium, or a combination thereof.

The high potassium content liquid fertilizer is intended to be used in all cropping rotations and management practices where it can be placed in-furrow at planting, injected into the soil, surface dribbled in a band, sprayed between crop rows, or broadcast, foliar or fertigation applied to meet the crops' potassium requirements. The fertilizer is intended to be used on any potassium-requiring crops, such as but not limited to, corn, soybeans, wheat, alfalfa, sugar beets, potatoes, grapes, onions, peppers, lettuce, beans, celery, cauliflower, broccoli, pumpkins, nectarines, tomatoes, other fruits and vegetables, and pulse crops. For crop application, the fertilizer composition comprises from about 15 wt % to about 27 wt % available potassium in the form of $K_2O$ and is applied at a rate of about 0.25 gallons per acre to about 10 gallons per acre.

DETAILED DESCRIPTION OF THE PRESENT DEVELOPMENT

The present development is a method of use for an environmentally-friendly high potassium-content liquid fertilizer (hereinafter referred to as "High-K") for fertilizing agricultural crops. The High-K is an aqueous liquid fertilizer comprising from about 10 wt % to about 27 wt % available potassium in the form of $K_2O$, and optionally, metal additives at concentrations of up to 25 wt %.

The available potassium is derived potassium acetate, potassium formate, potassium citrate, potassium succinate, potassium propionate, potassium phosphate, organic sources of potassium, animal manure, and combinations thereof. In a preferred embodiment, potassium acetate is used. The High-K has available potassium in the form of $K_2O$ at a concentration of from about 10 wt % to about 27 wt %, and more preferably from about 14 wt % to about 27 wt %, and most preferably from about 18 wt % to about 27 wt %. Further, the potassium source selected and the amount added to the composition should provide a buffering function to the composition and should maintain the fertilizer pH between 7.0 and 10.5, and more preferably between 8.5 to 10.0.

Optionally, the fertilizer may further comprise a secondary nutrient selected from the group consisting of sulfur, zinc, boron, calcium, manganese, iron, copper, cobalt, magnesium, or a combination thereof. The sulfur is preferably provided as potassium thiosulfate, the zinc is preferably added as zinc ethylenediaminetetraacetic acid (ZnEDTA), the calcium is preferably added as calcium ethylenediaminetetraacetic acid (CaEDTA), the manganese is preferably added as manganese ethylenediaminetetraacetic acid (MnEDTA), the iron is preferably added as iron ethylenediaminetetraacetic acid (FeEDTA) or iron N-(hydroxyethyl) ethylenediaminetriacetic acid (FeHEDTA) or iron ethylenediamine-N,$N^1$-bis(2-hydroxyphenylacetic acid) (FeEDDHA) or iron ethylenediamine-di(2-hydroxy-5-sulfophenylacetic acid) (FeEDDHSA), the cobalt is preferably added as cobalt ethylenediaminetetraacetic acid (CoEDTA) or cobalt sulfate, the magnesium is preferably added as magnesium ethylenediaminetetraacetic acid (MgEDTA), the copper is preferably added as copper ethylenediaminetetraacetic acid (CuEDTA), and the boron is preferably added as disodium octaborate tetrahydrate or sodium borate. The resulting available metal in the final composition may be from 0 wt % to about 25 wt %, and more preferably from about 0.2 wt % to about 7 wt %, and most preferably from about 0.2 wt % to about 2.7 wt %.

Water is added to balance the composition.

In a preferred embodiment, the composition is prepared by slowly adding to water the other composition ingredients, and then mixing at ambient temperature for at least 60 minutes ensuring that the temperature is held below 50° C.

The High-K is beneficial for fertilizing all potassium-requiring crops. Non-limiting examples of crops which may be treated with the KA-fertilizer of the invention include corn, soybeans, wheat, alfalfa, sugar beets, potatoes, grapes, onions, peppers, lettuce, beans, celery, cauliflower, broccoli, pumpkins, nectarines, tomatoes, other fruits and vegetables, and pulse crops.

The High-K may be applied by a variety of methods. It may be applied as provided or in combination with other fertilizers or pesticides. For example and without limitation, the High-K may be applied as a starter fertilizer, as an in-furrow treatment, as a foliar fertilizer, as a side-dressed treatment after planting, as a soil injected fertilizer, and for broadcast, soil-injection and fertigation applications. The High-K may be used in no-tillage and minimal tillage conditions where it can be injected into the soil, surface dribbled in a band, sprayed between crop rows, or broadcast applied to meet the crops' potassium requirements.

The High-K can be applied in combination with other fertilizer products. For example, the High-K may be applied essentially concurrently with an ammonium polyphosphate (APP) fertilizer such as 10-34-0 or 11-37-0, with a urea ammonium nitrate (UAN) fertilizer such as 28-0-0 or 32-0-0, or with NPK fertilizers such as 6-24-6, 9-24-3, etc. Typical potassium sources for APP fertilizers and UAN fertilizers are potassium chloride, potassium sulfate, potassium nitrate, potassium carbonate and potassium thiosulfate. Unlike potassium chloride or potassium sulfate or potassium nitrate, which are each provided as a solid that needs to be dissolved in hot water before combining with an APP fertilizer or an UAN fertilizer, because the High-K is in the liquid state it can be combined with the APP fertilizer or UAN fertilizer without the need to dissolve the High-K saving time and heating costs. In contrast to potassium carbonate, the High-K does not include any components that can react with other components in the APP fertilizers or UAN fertilizers to cause foaming or effervescence which can create risk of product loss by overflow or risk of a pressure build-up in an enclosed tank with the concomitant risk of explosion. High-K also tends to be able to provide a mild buffering effect to any composition thereby preventing rapid changes in pH but without such strong buffering that the pH cannot be modified as desired. Potassium thiosulfate is known in the art to be very pH sensitive, and when potassium thiosulfate is combined with an APP fertilizer that has a pH below about 6.0, the sulfur in the thiosulfate will irreversibly precipitate out of solution. Similar precipitation is not observed with High-K. Potassium carbonate has a relatively high pH and when combined with an APP fertilizer can create a high pH environment that can cause many pesticides to undergo alkaline hydrolysis, thereby severely decreasing the efficacy of the pesticide. Further, the High-K can be applied with herbicides to reduce the amount of trips over the field thus saving time, fuel and reducing soil compaction.

In an exemplary embodiment, not intended to be limiting with respect to scope of the development, a High-K composition comprising potassium acetate wherein the available potassium in the form of $K_2O$ is at a concentration of about 24 wt % is blended with an ammonium polyphosphate 10-34-0 fertilizer (APP) to prepare a series of samples having volume-per-volume blend ratios of from about 1 APP:1 High-K to about 29 APP:1 High-K. Both the High-K composition and the APP fertilizer are in liquid form, so the products are able to be mixed on a volume per volume basis with no heating or dissolving steps required. No effervescence was observed in any of the samples during the mixing process. No precipitants are formed in any of the samples immediately after mixing. The samples are stored at room temperature and at about 40° C. to simulate spring planting conditions. After ten (10) days storage, slight precipitation is observed in the 1 APP:1 High-K through the 5 APP:1 High-K samples, with the degree of precipitation decreasing as the amount of APP increased relative to High-K. For samples at a ratio of 6 APP:1 High-K and higher, no precipitation is observed.

The KA-fertilizer is applied at different rates or amounts depending upon the particular crop and the method of fertilization. When the fertilizer is applied directly next to the seed in a clay loam soil, it is typically applied at a rate of from about 1 gal/acre to about 6 gal/acre. When the fertilizer is applied directly next to the seed in a sandy soil, it is typically applied at a rate of from about 1 gal/acre to about 3 gal/acre. In a banded application with the KA-fertilizer being applied two inches (2") to the side of the seed row and two inches (2") below the seed row (also referred to as a 2×2 application) or two inches (2") to the side of the seed on the surface (also referred to as a 2×0 application), or any other spacing close to the seed greater than 2 inches, the KA-fertilizer should be applied at a rate of from about 1 gal/acre to about 8 gal/acre. If the KA-fertilizer is being applied on the soil, regardless of what type of soil, away from the seed (greater than 2 inches), then it should be applied at a rate of from about 1 gal/acre to about 15 gal/acre. As is known in the art, if the KA-fertilizer is being applied concurrently or immediately before or after another fertilizer, then the amount of the KA-fertilizer may need to be adjusted to prevent overdosing the plant.

Laboratory studies and field trials have proven potassium acetate (KA) to be an effective and safe source of potassium for crop production. For in-furrow starter fertilizers, as well as 2×2 applications, the amount of potassium acetate that can be safely applied with the seed is approximately 1 to 5 times more than potassium chloride on clay loam soils. A liquid fertilizer comprising or composed primarily of KA is readily absorbed into the soil thereby reducing the amount of free salt available that could be harmful to germination. In a preferred embodiment, the fertilizer composition of the present invention has an electrical conductivity salt index of about 44.

For example, without limitation, in a field study conducted by Colorado State University, potato tuber yield and quality were evaluated in response to treatment with muriate of potash (MOP), sulfate of potash (SOP), and potassium acetate (0-0-24 NPK, referred to herein as "Bio-K"). Treatments included a) application of Bio-K pre-plant (Bio-K Pre), b) Bio-K Pre, followed by foliar application of Bio-K (Bio-K Pre+foliar), c) foliar application of Bio-K (Bio-K foliar), d) application of muriate of potash pre-plant (MOP Pre), and e) application of MOP pre-plant, followed by foliar application of Bio-K (MOP Pre+Bio-K foliar). A control treatment was included where no potassium-containing fertilizer was applied. Results from the studies showed that Bio-K Pre and Bio-K foliar enhanced tuber bulking. Pre-plant application of Bio-K increased marketable tuber (>4 oz) yield by 20% and 6%, compared to the control and MOP Pretreatments, respectively. Foliar application of Bio-K increased tuber specific gravity. Data from this study indicate that pre-plant application of Bio-K as source of K fertilizer can increase marketable tuber yield.

Surprisingly, potassium acetate has been shown to be an effective fertilizer for cottonseed in certain soil types. Cottonseed is a particularly challenging crop to fertilize because of the sensitivity of the cottonseed to salt. In a laboratory study conducted by North Central Texas College, days until cottonseed emergence, days until unfolding of cotyledon, and percentage of cottonseed attaining a first true leaf by 21 days was evaluated using different concentrations of High-K compared to unfertilized specimens. A High-K formulation of 0-0-24 with the potassium source being potassium acetate was used to fertilize Bayer Fibermax cottonseed variety FM1740B2F planted in soil obtained from sites in west Texas. The soil was analyzed prior to planting and had a pH of 8.3, contained about 1.1% organic matter, and had a cation exchange capacity between 16 and 17.3 meq/100 g. The fertilizer was applied at concentrations of 2 gallons per acre and 6 gallons per acre. Fertilizer was placed directly on top of the seed. As indicated in Table I, seeds subjected to the 2 gallon 0-0-24 treatment required a longer time period than either the control (no fertilizer) seeds or the 6 gallon 0-0-24 treatment to emerge and until the unfolding of the cotyledon, but a significantly higher percentage of the cottonseed exposed to the 2 gallon 0-0-24 treatment emerged and attained a first true leaf by Day 21. Thus, the High-K formulation of 0-0-24 with the potassium source being potassium acetate appears to be an excellent starter fertilizer for cottonseed in alkaline pH soils.

TABLE I

| | Days until emergence | % of cottonseed emerging | Days until unfolding of cotyledon | % attaining first true leaf by Day 21 |
|---|---|---|---|---|
| Control (no fertilizer) | 4.8 | 79% | 6.0 | 56% |
| 0-0-24 @ 2 gal/acre | 6.8 | 100% | 8.4 | 89% |
| 0-0-24 @ 6 gal/acre | 3.9 | 55% | 4.3 | 39% |

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. The term "ambient temperature" as used herein refers to an environmental temperature of from about 0° F. to about 120° F., inclusive.

As used herein, the specified terms are defined as follows: (1) "NPK" is an abbreviation for a composite fertilizer containing one or more sources of nitrogen (N), phosphorus (P in the form of $P_2O_5$) and/or potassium (K in the form of $K_2O$) at the wt % designated by the specific placeholder N—P—K; (2) "starter fertilizer" is a fertilizer applied in low doses close to the plant seed used to promote the growth of newly planted crops, particularly newly germinated seeds; (3) "banded fertilizer" is a fertilizer applied in low doses along the side of the seed row and either on the surface or below the seed row; (4) "in-furrow application" refers to the process of placing fertilizers directly with the seed during planting; (5) "top-dress" refers to broadcast applications on crops like small grains; (6) "side dress" refers to fertilizer placed at relatively high amounts anywhere from three to four inches from the row to half way between the crop rows; (7) "foliar application" refers to the process of applying liquid fertilizer directly to the leaves of a plant; (8) "broadcast application" refers to a uniform distribution of material on the soil surface; and, (9) "fertigation" refers to the injection of fertilizer into an irrigation system.

Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

All compositional percentages used herein are presented on a "by weight" basis, unless designated otherwise.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A method for fertilizing an agricultural crop comprising applying a liquid fertilizer composition at a rate of from 0.25 gallons per acre to 10 gallons per acre wherein the method of fertilizer composition application is selected from the group consisting of in-furrow application, foliar application, side-dress treatment after planting, pre-planting soil injection, broadcast application, banding 2×2 and fertigation; and, wherein the fertilizer composition consists of:

a. from 10 wt % to 27 wt % available potassium in the form of $K_2O$ wherein the available potassium is from a potassium source selected from the group consisting of potassium acetate, potassium citrate, potassium succinate, potassium propionate, and combinations thereof;

b. from 0 wt % to 25 wt % secondary nutrient selected from the group consisting of sulfur, zinc, boron, calcium, manganese, iron, copper, cobalt, magnesium, and combinations thereof; and, c. water to balance.

2. The method of claim 1 wherein the agricultural crop is selected from the group consisting of corn, soybeans, wheat, alfalfa, sugar beets, potatoes, grapes, onions, peppers, lettuce, beans, celery, cauliflower, broccoli, pumpkins, nectarines, tomatoes, other fruits and vegetables, cottonseed, and pulse crops, and combinations thereof.

3. The method of claim 1, wherein the composition has a pH range of about 7.0 to about 10.5.

4. The method of claim 3, wherein the composition has a pH range of about 8.5 to about 10.0.

5. The method of claim 1, wherein the fertilizer composition has an electrical conductivity salt index of about 44.

6. The method of claim 1 wherein the fertilizer composition is applied as a starter fertilizer.

7. The method of claim 1 wherein the fertilizer composition is applied next to seed in a clay loam soil or next to seed in a sandy soil or to a side of a seed row and below the seed row or to a side of a seed row and on the surface above the seed row.

8. The method of claim 7 wherein the fertilizer composition is applied next to seed in a clay loam soil at a rate of about 1 gallon per acre to about 6 gallons per acre.

9. The method of claim 7 wherein the fertilizer composition is applied next to seed in a sandy soil at a rate of about 1 gallons per acre to about 3 gallons per acre.

10. The method of claim 7 wherein the fertilizer composition is applied to a side of a seed row and below the seed row at a rate of about 1 gallons per acre to about 15 gallons per acre.

11. The method of claim 1 wherein the secondary nutrient is from a secondary nutrient source selected from the group consisting of potassium thiosulfate, zinc ethylenediaminetetraacetic acid, calcium ethylenediaminetetraacetic acid, manganese ethylenediaminetetraacetic acid, iron ethylenediaminetetraacetic acid, iron N-(hydroxyethyl)ethylenediaminetriacetic acid, iron ethylenediamine-N,$N^1$-bis(2-hydroxyphenylacetic acid), iron ethylenediamine-di(2-hydroxy-5-sulfophenylacetic acid), cobalt ethylenediaminetetraacetic acid (CoEDTA), cobalt sulfate, magnesium ethylenediaminetetraacetic acid, copper ethylenediaminetetraacetic acid, disodium octaborate, sodium borate and combinations thereof.

12. The method of claim 1 wherein the potassium source is potassium acetate.

13. The method of claim 1 wherein the potassium source is potassium citrate.

14. The method of claim 1 wherein the potassium source is potassium succinate.

15. The method of claim 1 wherein the potassium source is potassium propionate.

* * * * *